(12) United States Patent
McGranahan

(10) Patent No.: US 10,533,921 B2
(45) Date of Patent: Jan. 14, 2020

(54) TUNABLE MASS DAMPER CHARACTERIZATION TEST STAND

(71) Applicant: The Boeing Company, Chicago, IL (US)

(72) Inventor: Bryan D. McGranahan, O'Fallon, MO (US)

(73) Assignee: The Boeing Company, Chicago, IL (US)

(*) Notice: Subject to any disclaimer, the term of this patent is extended or adjusted under 35 U.S.C. 154(b) by 465 days.

(21) Appl. No.: 15/368,416

(22) Filed: Dec. 2, 2016

(65) Prior Publication Data
US 2018/0156689 A1 Jun. 7, 2018

(51) Int. Cl.
*G01M 7/02* (2006.01)

(52) U.S. Cl.
CPC ............ *G01M 7/027* (2013.01); *G01M 7/025* (2013.01)

(58) Field of Classification Search
CPC ............................... G01M 7/027; G01M 7/025
See application file for complete search history.

(56) References Cited

U.S. PATENT DOCUMENTS

| | | |
|---|---|---|
| 2,819,775 A | 1/1958 | Everett |
| 2,854,100 A | 9/1958 | Bowser et al. |
| 3,173,514 A | 3/1965 | Tiedemann |
| 3,572,112 A | 3/1971 | Igoe |
| 3,934,535 A | 1/1976 | Culver |
| 4,600,686 A | 7/1986 | Meyer et al. |
| 4,660,689 A | 4/1987 | Hayashi et al. |
| 5,558,191 A | 9/1996 | Lai |
| 5,644,075 A | 7/1997 | Hefer |
| 5,816,373 A | 10/1998 | Osterberg et al. |

(Continued)

FOREIGN PATENT DOCUMENTS

| | | |
|---|---|---|
| DE | 1039851 B | 9/1958 |
| DE | 3316177 A1 | 11/1984 |

(Continued)

OTHER PUBLICATIONS

Taft et al., "Determination of the Temperature Dependent Spring Constant of a Nitinol Expansion Spring", Nov. 29, 2006, accessed online <https://www.imagesco.com/science/Nitinol-Spring%20Data.pdf> in May 2018, 13 pages.

(Continued)

*Primary Examiner* — Xin Y Zhong
(74) *Attorney, Agent, or Firm* — Kolisch Hartwell, P.C.

(57) ABSTRACT

A test stand for characterization of a tunable mass damper may include (a) a support base including a stop member, (b) a test plate coupled to the support base, with the test plate configured to move relative to the support base and to fixedly carry a tunable mass damper, (c) a spring coupled to the support base and the test plate, (d) a lever configured to be releasably coupled to the test plate and to move the test plate relative to the support base against the urging of the spring, and (e) a latch mechanism configured to release the test plate from the lever when the test plate is at a predetermined position relative to the support base. The motion of the test plate, after the test plate has been released by the latch mechanism, may be halted by the stop member of the support base.

20 Claims, 8 Drawing Sheets

(56) References Cited

U.S. PATENT DOCUMENTS

| | | | | |
|---|---|---|---|---|
| 6,182,495 | B1* | 2/2001 | Hansen | G01M 7/08 |
| | | | | 73/12.01 |
| 7,127,942 | B2 | 10/2006 | Gibson | |
| 7,681,701 | B2 | 3/2010 | Mikonaho | |
| 2003/0172714 | A1* | 9/2003 | Maeno | G01M 7/08 |
| | | | | 73/12.01 |
| 2012/0168271 | A1* | 7/2012 | Ryaboy | F16F 7/116 |
| | | | | 188/379 |
| 2016/0069409 | A1 | 3/2016 | McGranahan et al. | |
| 2016/0319895 | A1 | 11/2016 | Griffin et al. | |
| 2017/0241862 | A1 | 8/2017 | McGranahan | |

FOREIGN PATENT DOCUMENTS

| | | |
|---|---|---|
| GB | 468365 A | 12/1935 |
| GB | 539720 A | 9/1941 |
| GB | 771663 A | 4/1957 |
| WO | 9842998 A2 | 10/1998 |
| WO | 9842998 A3 | 10/1998 |

OTHER PUBLICATIONS

U.S. Patent and Trademark Office, Office action in U.S. Appl. No. 15/237,375, dated May 31, 2018, 41 pages.

Superflow Technologies Group, Airflow Basics Service Procedure, URL: http://www.superflow.com/support/supportDocuments/airflow_basics.pdf, 2000, 6 pages.

Ogilvy, Fergus, "How Renault F1 Won a World Championship by Creating the Tuned Mass Damper", URL: http://mooregoodink.com/how-renault-f1-found-faster-lap-times-and-won-a-world-championship-by-creating-the-tuned-mass-damper/, Nov. 4, 2013, 3 pages.

NASA Technical Memorandum, "Reduction of Wind-Tunnel-Model Vibration by Means of a Tuned Damped Vibration Absorber Installed in the Model", NASA TM X-1606, Jan. 1, 2015, 31 pages.

Theory of Machines, TM-164 Free Vibrations of a Mass-spring System, URL: http://www.tecquipment.com/Datasheets/TM164_1015.pdf, circa before Dec. 3, 2015, 3 pages.

Wikipedia, "Damping", URL: https://en.wikipedia.org/wiki/Damping, circa before Jan. 5, 2016, 8 pages.

United States Patent and Trademark Office, Office action in U.S. Appl. No. 14/477,701, dated Sep. 17, 2015, 13 pages.

European Patent Office, Extended European Search Report in European Patent Application No. 15179083.9-1557, dated Feb. 8, 2016, 9 pages.

United States Patent and Trademark Office, Office action in U.S. Appl. No. 14/477,701, dated Feb. 17, 2016, 12 pages.

Maurer Söhne, "Maurer Tuned Mass and Viscous Dampers" dated Jul. 29, 2011, retrieved from the Internet on Jul. 7, 2014 from http://www.maurersoehne.com/files/bauwerkschutzsysteme/pdf/en/brochure/MAURER_Tuned_Mass_and_Viscous_Dampers.pdf, 32 pages.

U.S. Patent and Trademark Office, Office action in U.S. Appl. No. 15/048,876, dated Nov. 20, 2017, 25 pages.

* cited by examiner

TUNABLE MASS DAMPER CHARACTERIZATION TEST STAND

CROSS-REFERENCES

The following related applications are incorporated herein, in their entireties, for all purposes: U.S. patent application Ser. No. 14/477,701, filed Sep. 4, 2014; U.S. patent application Ser. No. 15/048,876 filed Feb. 19, 2016; and U.S. patent application Ser. No. 15/237,375, filed Aug. 15, 2016.

FIELD

This disclosure relates to wind tunnel testing of aircraft models. More specifically, the disclosed embodiments relate to systems and methods for characterizing oscillation properties of tunable mass dampers prior to installation of the dampers in aircraft models.

INTRODUCTION

Aerodynamic testing of models in wind tunnels is a common and important part of the aeronautics industry. Accurate testing is necessary for safety, and can potentially save millions of dollars by eliminating real-world test flights. An inherent complication of wind tunnel testing is the introduction of experimental artifacts that would not be present in a real-world setting. Such artifacts include the forces exerted on a model during testing that arise from the support structure that is holding the model in place. These forces would obviously not be present on a real-world aircraft, and can interfere with any efforts to measure the forces on the model that arise from the aerodynamic performance of the model itself.

One solution to the problem of undesirable artifact forces is to reduce the dynamic pressure of the wind tunnel and hence the wind speed. This solution has the disadvantage of increasing the chance of scale effects in the wind tunnel data. A second solution is to build extra stiffness into the support structure, thus decreasing vibrations of the support structure and the associated forces on the model from the support structure. This is usually done by increasing the balance capacity and the size of the support. However, increasing the balance capacity would tend to decrease the sensitivity of the tests, and increasing the size of the support would take the model farther away from the reality it is trying to replicate, both undesirable effects. A third solution is to avoid test conditions that would give rise to unsteady aerodynamic phenomena, such as wing drop or buffet, which can excite the natural vibrational modes of the support structure. This is the worst of the three solutions, because the results of tests under such conditions are often of great interest to the end users of the wind tunnel data.

A mass-damping apparatus, or mass damper, can effectively increase the damping of a wind tunnel support system without a need for reducing wind tunnel dynamic pressure, increasing stiffness of the support, or avoiding conditions that would give rise to unsteady aerodynamic phenomena. Generally speaking, a mass damper is a damped oscillator that can be coupled to a wind tunnel model. The natural frequency of the oscillator can be chosen to coincide with a natural frequency of an undesirable artifact vibration of the wind tunnel support, which allows coupling of the motion of the damper mass with that of the wind tunnel support. This coupling enables the mass damper to influence the wind tunnel support system by replacing a single oscillatory mode with low damping with a coupled wind tunnel support/mass damper oscillation with higher damping.

Some mass dampers may be "tuned" by choosing components of the device accordingly. For example, if a mass damper includes an oscillating mass and a spring, the mass may be chosen from a set of masses and the spring chosen from a set of springs. Depending on the choice made for the mass and the spring, the mass may oscillate at a particular natural frequency and thereby absorb energy at that frequency. A different choice for either or both of the mass and spring may result in a different natural frequency. Other oscillation properties of mass dampers may also be tuned, such as a characteristic damping time of the oscillator, by, for example, restricting the flow of a damping medium within the mass-damping apparatus.

In order to install a correctly-tuned mass-damping apparatus into a wind tunnel model, the actual oscillation characteristics of the mass-damping apparatus would ideally be known prior to installation. Then, a user can be confident that the mass-damping apparatus will actually perform as intended during a wind tunnel test. The performance of the mass-damping apparatus may include absorbing energy from vibrations of a particular frequency and dissipating the absorbed energy over a desired timescale. It may be important to accurately measure the oscillation characteristics of the mass-damping apparatus prior to installation and use.

One existing solution for characterizing the oscillation properties of a given configuration of a mass-damping apparatus includes literally smacking the mass-damping apparatus on a table to create an impulse force and measuring the subsequent oscillations of an included mass. Oscillation properties can be determined, for example, from position data of the mass as it oscillates. This solution may not be particularly repeatable and may lead to relatively large uncertainties in the determined quantities, such as oscillation frequency and damping time.

Another existing solution for characterizing the oscillation properties of a given configuration of a mass-damping apparatus includes coupling the mass-damping apparatus to a vibration shaker table. The table is shaken at a known displacement while the driving frequency of the table is scanned across a range of driving frequencies. During or subsequent to the shaking the oscillations of the mass may be recorded, from which the oscillation properties may be determined. This solution may be prohibitively expensive and time consuming, may require more advanced analysis of the mass position data, and requires access to a shaker table.

SUMMARY

In some embodiments, a test stand for characterization of a tunable mass damper may include a support base including a stop member. The test stand may further include a test plate coupled to the support base, with the test plate configured to move relative to the support base and to fixedly carry a tunable mass damper. The test stand may include a spring coupled to the support base and the test plate. The test stand may include a lever configured to be releasably coupled to the test plate and to move the test plate relative to the support base against the urging of the spring. The test stand may include a latch mechanism configured to release the test plate from the lever when the test plate is at a predetermined position relative to the support base. The test plate may move at the urging of the spring after being released by the latch mechanism. The motion of the test plate, after the test plate has been released by the latch mechanism, may be halted by the stop member of the support base.

In some embodiments, a method of characterizing the oscillation properties of a tunable mass damper may include mounting a tunable mass damper to a test plate, the test plate being biased away from a support base by a spring. The method may include moving the test plate against a force of the spring until a latch mechanism is disengaged at a predetermined separation distance between the test plate and the support base. The method may include measuring oscillation properties of the tunable mass damper after motion of the test plate relative to the support base is stopped by a stop mechanism.

In some embodiments, a system for testing a tunable mass damper may include a test stand configured to provide a repeatable impulse to the tunable mass damper. The test stand may include (a) a support base, (b) a test plate coupled to the support base, the test plate configured to move relative to the support base and to fixedly carry a tunable mass damper, (c) a biasing member urging the test plate away from the support base, (d) a loading member configured to move the test plate relative to the support base against the urging of the biasing member, and (e) a release mechanism configured to release the test plate from the loading member when the test plate is at a predetermined position relative to the support base. The system may further include a computing device. The computing device may include (f) a processor, (g) a memory, and (h) a program including a set of instructions stored in the memory. The program may be executable by the processor to (i) receive data from a detector associated with the tunable mass damper and (j) identify one or more oscillation characteristics of the tunable mass damper based on the received data, the one or more oscillation characteristics including at least one of an oscillation frequency of the tunable mass damper and a characteristic damping time of the tunable mass damper.

Features, functions, and advantages may be achieved independently in various embodiments of the present disclosure, or may be combined in yet other embodiments, further details of which can be seen with reference to the following description and drawings.

DESCRIPTION

Overview

Figure 1:
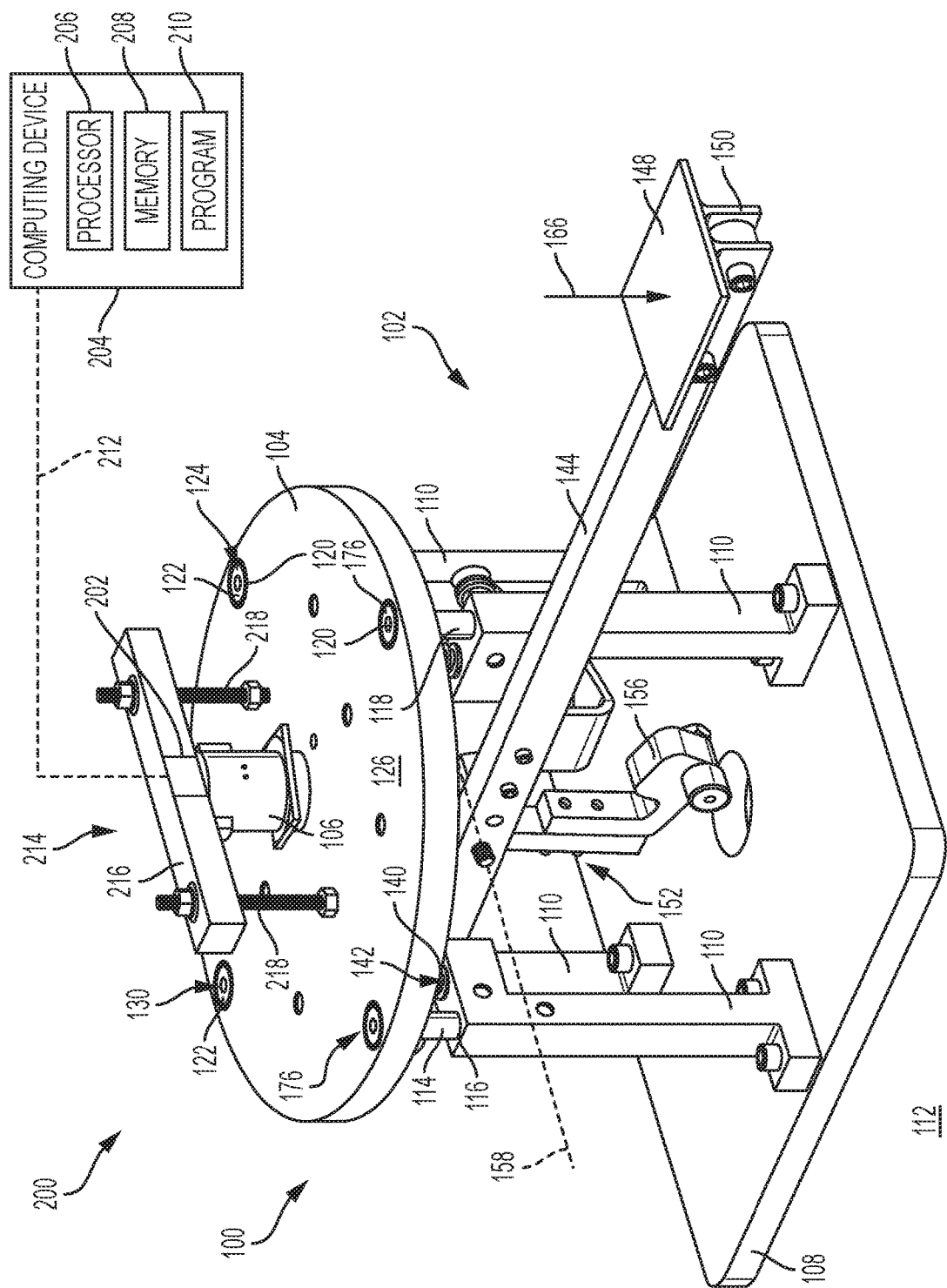
FIG. 1 is an upper trimetric view of an illustrative embodiment of a test stand for characterization of a tunable mass damper.

Various embodiments of a test stand having a lever and an adjustable release mechanism are described below and illustrated in the associated drawings, as well as related systems and methods. Unless otherwise specified, the test stand and/or its various components may, but are not required to, contain at least one of the structure, components, functionality, and/or variations described, illustrated, and/or incorporated herein. Furthermore, the structures, components, functionalities, and/or variations described, illustrated, and/or incorporated herein in connection with the present teachings may, but are not required to, be included in other similar characterization apparatuses. The following description of various embodiments is merely exemplary in nature and is in no way intended to limit the disclosure, its application, or uses. Additionally, the advantages provided by the embodiments, as described below, are illustrative in nature and not all embodiments provide the same advantages or the same degree of advantages.

Aspects of a system for testing a tunable mass damper may be embodied as a computer method, computer system, or computer program product. Accordingly, aspects of the testing system may take the form of an entirely hardware embodiment, an entirely software embodiment (including firmware, resident software, micro-code, and the like), or an embodiment combining software and hardware aspects, all of which may generally be referred to herein as a "circuit," "module," or "system." Furthermore, aspects of the testing system may take the form of a computer program product embodied in a computer-readable medium (or media) having computer-readable program code/instructions embodied thereon.

Any combination of computer-readable media may be utilized. Computer-readable media can be a computer-readable signal medium and/or a computer-readable storage medium. A computer-readable storage medium may include an electronic, magnetic, optical, electromagnetic, infrared, and/or semiconductor system, apparatus, or device, or any suitable combination of these. More specific examples of a computer-readable storage medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, and/or any suitable combination of these and/or the like. In the context of this disclosure, a computer-readable storage medium may include any suitable tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, and/or any suitable combination thereof. A computer-readable signal medium may include any computer-readable medium that is not a computer-readable storage medium and that is capable of communicating, propagating, or transporting a program for use by or in connection with an instruction execution system, apparatus, or device.

Program code embodied on a computer-readable medium may be transmitted using any appropriate medium, including but not limited to wireless, wireline, optical fiber cable, RF, and/or the like, and/or any suitable combination of these.

Computer program code for carrying out operations for aspects of the testing system may be written in one or any combination of programming languages, including an object-oriented programming language such as Java, Smalltalk, C++, and/or the like, and conventional procedural programming languages, such as the C programming language. The program code may execute entirely on a user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), and/or the connection may be made to an external computer (for example, through the Internet using an Internet Service Provider).

Aspects of the testing system are described below with reference to flowchart illustrations and/or block diagrams of methods, apparatuses, systems, and/or computer program products. Each block and/or combination of blocks in a flowchart and/or block diagram may be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer-readable medium that can direct a computer, other programmable data processing apparatus, and/or other device to function in a particular manner, such that the instructions stored in the computer-readable medium produce an article of manufacture including instructions which implement the function/act specified in the flowchart and/or block diagram block or blocks.

The computer program instructions can also be loaded onto a computer, other programmable data processing apparatus, and/or other device to cause a series of operational steps to be performed on the device to produce a computer-implemented process such that the instructions which execute on the computer or other programmable apparatus provide processes for implementing the functions/acts specified in the flowchart and/or block diagram block or blocks.

Any flowchart and/or block diagram in the drawings is intended to illustrate the architecture, functionality, and/or operation of possible implementations of systems, methods, and computer program products according to aspects of testing system. In this regard, each block may represent a module, segment, or portion of code, which comprises one or more executable instructions for implementing the specified logical function(s). In some implementations, the functions noted in the block may occur out of the order noted in the drawings. For example, two blocks shown in succession may, in fact, be executed substantially concurrently, or the blocks may sometimes be executed in the reverse order, depending upon the functionality involved. Each block and/or combination of blocks may be implemented by special purpose hardware-based systems (or combinations of special purpose hardware and computer instructions) that perform the specified functions or acts.

EXAMPLES, COMPONENTS, AND ALTERNATIVES

The following sections describe selected aspects of exemplary test stands for characterization of a tunable mass damper, as well as related systems and/or methods. The examples in these sections are intended for illustration and should not be interpreted as limiting the entire scope of the present disclosure. Each section may include one or more distinct inventions, and/or contextual or related information, function, and/or structure.

Example 1

This example describes an illustrative test stand for characterization of a tunable mass damper; see FIGS. 1-5.

Figure 2:
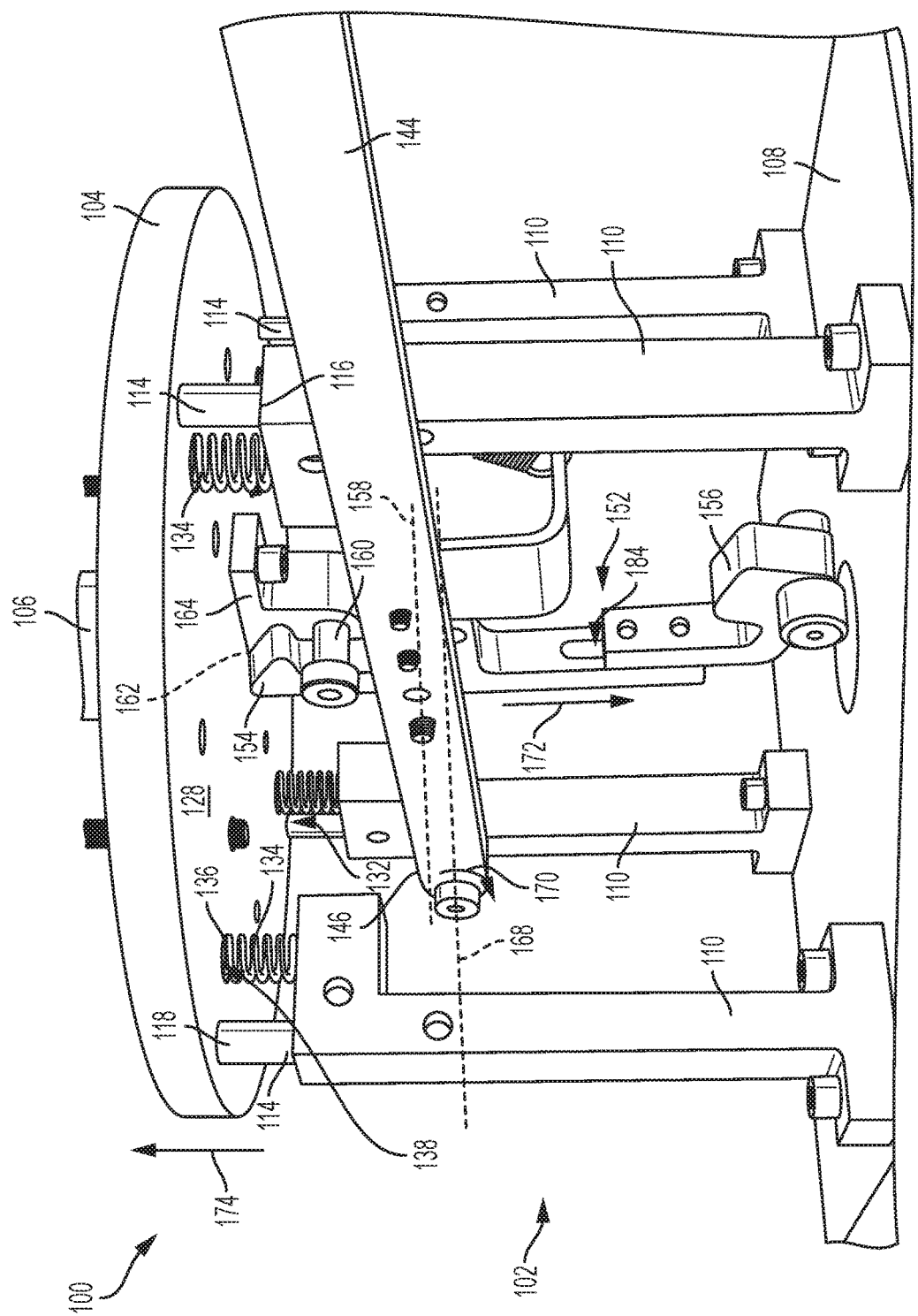
FIG. 2 is a lower perspective view of the test stand of FIG. 1.

FIG. 1 is an upper trimetric view of an illustrative embodiment of a test stand for characterization of a tunable mass damper, the test stand generally indicated at 100. FIG. 2 is a lower perspective view of test stand 100. FIGS. 1 and 2 are herein described together. Test stand 100 includes a support base 102 and a test plate 104 coupled to the support base. The test plate is configured to move relative to the support base and to fixedly carry a tunable mass damper (TMD) 106.

Support base 102 may include a base plate 108 and a plurality of support legs 110 coupled to the base plate. Base plate 108 may be configured to be supported on a work surface 112 such as a table, a desk, or a floor. In some examples, base plate 108 may be secured to the work surface by a clamp, bolts, or some other appropriate fastener. In some examples, base plate 108 may rest on work surface 112 without being secured to the work surface. In some examples, base plate 108 may be omitted and support legs 110 may be supported and/or secured on work surface 112.

Each support leg 110 of the plurality of support legs may include a bolt 114 extending from a top end 116 of the support leg. Bolts 114 may each have a shaft portion 118 and a head portion 120 at a distal end 122 of the bolt relative to the support leg. Bolts 114 may be shoulder bolts or shoulder screws and shaft portion 118 may be the shoulder portion of the shoulder bolt. Shaft portion 118 may be an unthreaded portion of the bolt. Bolt 114 may have a threaded portion of the shaft received within an aperture in the top end 116 of the support leg 110.

Test plate 104 may include one or a plurality of apertures 124 extending from a top side 126 of the test plate to a bottom side 128 of the test plate. Each of apertures 124 may be positioned in test plate 104 so as to receive a portion of a bolt 114 associated with one of support legs 110. For example, the shaft portion 118 of each bolt may extend through or pass through one of apertures 124.

One or more of the one or more apertures 124 may have an upper portion 130 and a lower portion 132 with the upper portion sized to receive a head portion 120 of a bolt 114 and the lower portion sized to receive a shaft portion 118 of the bolt. That is, upper portion 130 may be a recess in the top side 126 of the test plate so that head portion 120 may sit within the upper portion of the aperture so as to be flush with the top side 126 of the test plate. Lower portion 132 of aperture 124 may be sized to not receive head portion 120 of bolt 114.

In some examples, the entire aperture 124 may be sized to receive shaft portion 118 of bolt 114 and to not receive head portion 120 of the bolt, as opposed to a portion of the aperture. In these examples, the head portion of one or more of the bolts may be configured to abut top side 126 of test plate 104 as the shaft portion 118 of the bolt passes through the aperture.

Test stand 100 may include a biasing member 134 urging test plate 104 away from support base 102. In some examples, biasing member 134 may be a spring 134, such as a coil spring, coupled to support base 102 and test plate 104. In some examples, the spring may be one of a plurality of springs 134 with each spring of the plurality of springs disposed between the top end 116 of an associated support leg 110 and the test plate. In examples including a plurality of springs, the springs may all have the same spring constant or may all have independent spring constants. In some other examples, biasing member 134 may include one or more cantilever springs or leaf springs, or may include an elastically deformable material such as rubber.

In some examples, one or more of springs 134 may be positioned between the support legs 110 and test plate 104 so that a top end 136 of the spring is received within an aperture 138 in the bottom side 128 of the top plate and a bottom end 140 of the spring is received within an aperture 142 in the top end of the support leg. In these examples the springs may be configured to be compressed enough within apertures 138 and 142 so that the test plate may contact or nearly contact the top ends 116 of the support legs.

Test stand 100 may include a loading member 144 configured to move test plate 104 relative to support base 102 against the urging of biasing member 134. In some examples, loading member 144 may be a lever 144 configured to be releasably coupled to test plate 104. In some other examples, loading member 144 may include a pulley system, an electromagnet, a hydraulic or pneumatic cylinder, or some other appropriate means for transmitting a force to the test plate. In some examples, loading member 144 may be actuated automatically or mechanically, for example by a program on a computing device, while in other examples, loading member 144 may be actuated manually by a user of test stand 100.

Lever 144 may be configured to move the test plate relative to support base 102 against the urging of spring or springs 134. Lever 144 may be rotatably coupled to the support base 102 at a first end 146 of the lever and may have a handle 148 at a second end 150 of the lever, with second end 150 opposite first end 146. Handle 148 may be configured to receive an activation force applied to the second end of the lever, for example, by a user of test stand 100 pressing down on the handle. In other examples, lever 144 may not include an explicit handle and a user may apply an activation force to lever 144 proximate the second end of the lever.

Lever 144 may be releasably coupled to test plate 104 via a release mechanism or latch mechanism 152. Latch mechanism 152 may be configured to release the test plate from the lever when the test plate is at a predetermined position relative to support base 102. Lever 144 may be configured to be releasably coupled to the test plate at a position intermediate the first end 146 and the second end 150 of the lever. That is, lever 144 may be a second class lever.

Latch mechanism 152 may include a hook portion 154 and a latch extension 156. Hook portion 154 may be rotatably coupled to lever 144. The hook portion may be configured to rotate relative to the lever about a first rotation axis 158. First rotation axis 158 may be generally perpendicular to the lever and the hook portion and generally parallel to test plate 104. Latch extension 156 may be adjustably coupled to the hook portion.

Test plate 104 may include a post 160 coupled to the bottom side 128 of the test plate. Post 160 may be configured to be releasably engaged by latch mechanism 152. Post 160 may be configured to be releasably engaged by hook portion 154 of the latch mechanism. Post 160 may be proximate a center 162 of the bottom side of the test plate. Post 160 may be coupled to the bottom side of the test plate via a bracket 164 so that the post has a generally horizontal orientation. Post 160 may be configured to be secured to hook portion 154 when the hook portion is in a generally vertical orientation and released from hook portion 154 when the hook portion has rotated through a sufficient angle about first rotation axis 158.

An illustrative example of using test stand 100 may include applying an activation force, indicated schematically by arrow 166, to the second end 150 of lever 144. Activation force 166 may cause lever 144 to rotate relative to support base 102 about a second rotation axis 168 proximate the first end 146 of the lever, as indicated by curved arrow 170. Rotation of lever 144 in direction 170 may cause latch mechanism 152 to move generally downward relative to the support base, as indicated by arrow 172. Downward movement of latch mechanism 152 may cause the test plate 104 to move downward relative to the support base, as hook portion 154 of the latch mechanism may be releasably coupled to post 160 of the test plate. This movement of the test plate may be against the urging of spring or springs 134.

When test plate 104 reaches a predetermined position relative to support base 102, the test plate may be released by latch mechanism 152. After being released by the latch mechanism, the test plate may move at the urging of spring or springs 134. After being released by the latch mechanism the test plate may move in an upward vertical direction 174 relative to the support base at the urging of spring(s) 134.

After the test plate has been released by the latch mechanism, the motion of the test plate may be halted by a stop member 176 of the support base. Stop member 176 may be formed by one or more of head portions 120 of the one or more bolts 114. Motion of the test plate may be halted by contact between the test plate and the head portions 120 of the bolts.

Thus, test plate 104 may move relatively slowly with respect to support base 102 by lever 144, thereby compressing spring(s) 134, until the test plate is released by latch mechanism 152. Upon release, the test plate may move relatively quickly with respect to the support base as the one or more spring extend until motion of the test plate relative to the support base is abruptly halted by stop member 176. In instances when tunable mass damper 106 has been coupled to test plate 104, the movement and subsequent halting of the test plate may excite oscillations of the tunable mass damper.

Test stand 100 may be part of a system, generally indicated at 200, for testing tunable mass damper 106. Examples of tunable mass dampers can be found at 20 in FIG. 2 and at 110 in FIGS. 3 and 4 of U.S. patent application Ser. No. 14/477,701; at 100 in FIG. 2 and at 200 in FIGS. 2 and 4 of U.S. patent application Ser. No. 15/048,876; and at 100 in FIG. 2, at 200 in FIG. 3, and at 300 in FIG. 4 of U.S. patent application Ser. No. 15/237,375.

A mass damper generally includes a mass capable of oscillating while coupled to one or more springs and a damping medium capable of removing energy from the oscillating mass and one or more springs. A mass damper may be tunable in the sense that one or more of the characteristics, such as an oscillation frequency or a damping time, of the mass damper may be changed. A tunable mass damper may be tuned by, for example, varying the mass, the effective spring constant of the one or more springs, or the configuration of the damping medium, among others.

A tunable mass damper may be associated with and/or include a detector capable of capturing data related to the oscillation characteristics of the damper. For example, a TMD may include a position detector configured to measure a plurality of positions of the mass within the TMD as the mass oscillates over time. Illustrative examples of a detector include position sensor 256 described in U.S. patent application Ser. No. 15/048,876 and position sensor 380 described in U.S. patent application Ser. No. 15/237,375. A detector 202 associated with tunable mass damper 106 is indicated schematically in FIG. 1. Detector 202 may be a position detector integrated into tunable mass damper 106 so as to monitor the position of a mass within the tunable mass damper over time.

System 200 may include a test stand, for example test stand 100 or a similar test stand, and a computing device or other data processing system 204. Computing device 204 may any appropriate computing device, such as a computer, laptop, tablet, smartphone, or an oscilloscope. For an illustrative example of a computing device, see FIG. 7 and related description.

Computing device 204 may include a processor 206, a memory 208, and a program 210 including a set of instructions stored in the memory and executable by the processor. The set of instructions may configure the processor to receive data from detector 202 and identify one or more oscillation characteristics of tunable mass damper 106 based on the received data. The one or more oscillation characteristics may include at least one of an oscillation frequency of the tunable mass damper and a characteristic damping time of the tunable mass damper.

Computing device 204 may receive data from detector 202 through a wired connection or a wireless connection. Communication between the detector and the computing device is indicated by dashed line 212.

In some examples, computing device 204 may display the data received from the processor to a user on a graphical user interface and the one or more oscillation characteristics may be determined by a user of system 200.

Test stand 100 and/or system 200 may include an attachment mechanism 214 configured to secure TMD 106 to test plate 104. Attachment mechanism 214 may include bolts, rivets, screws, or other appropriate fasteners. In the embodiment shown in FIG. 1, attachment mechanism 214 includes a bar 216 configured to abut the TMD and a pair of long bolts 218 configured to secure bar 216 to the test plate with the TMD disposed between the bar and the test plate. Many other attachment mechanisms are also possible.

Figure 3:
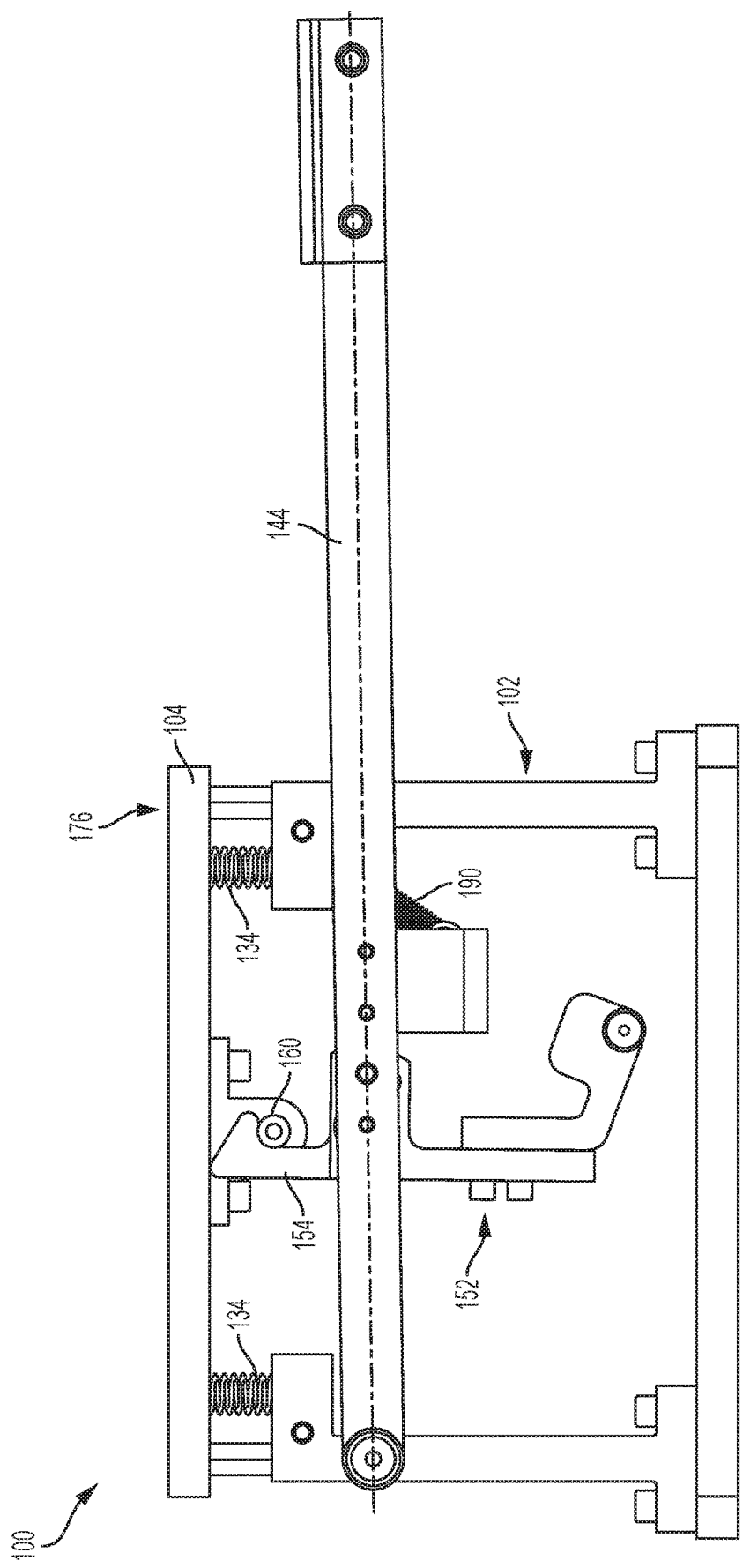
FIG. 3 is a side elevation view of the test stand of FIG. 1, with a support leg of the test stand omitted in order to show a latch mechanism, showing the test stand in a start configuration.

Returning to the description of test stand 100, FIG. 3 is a side elevation view of test stand 100 with a support leg of the test stand omitted in order to show latch mechanism 152. Test stand 100 is shown in a start configuration in FIG. 3 where lever 144 is coupled to test plate 104 via latch mechanism 152, hook portion 154 of latch mechanism 152 is engaged with post 160 of test plate 104, an activation force has not been applied to lever 144, and test plate 104 is in a first position relative to support base 102. Test plate 104 may be held in the first position against stop member 176, prior to activation of the lever, at the urging of spring(s) 134.

Figure 4:
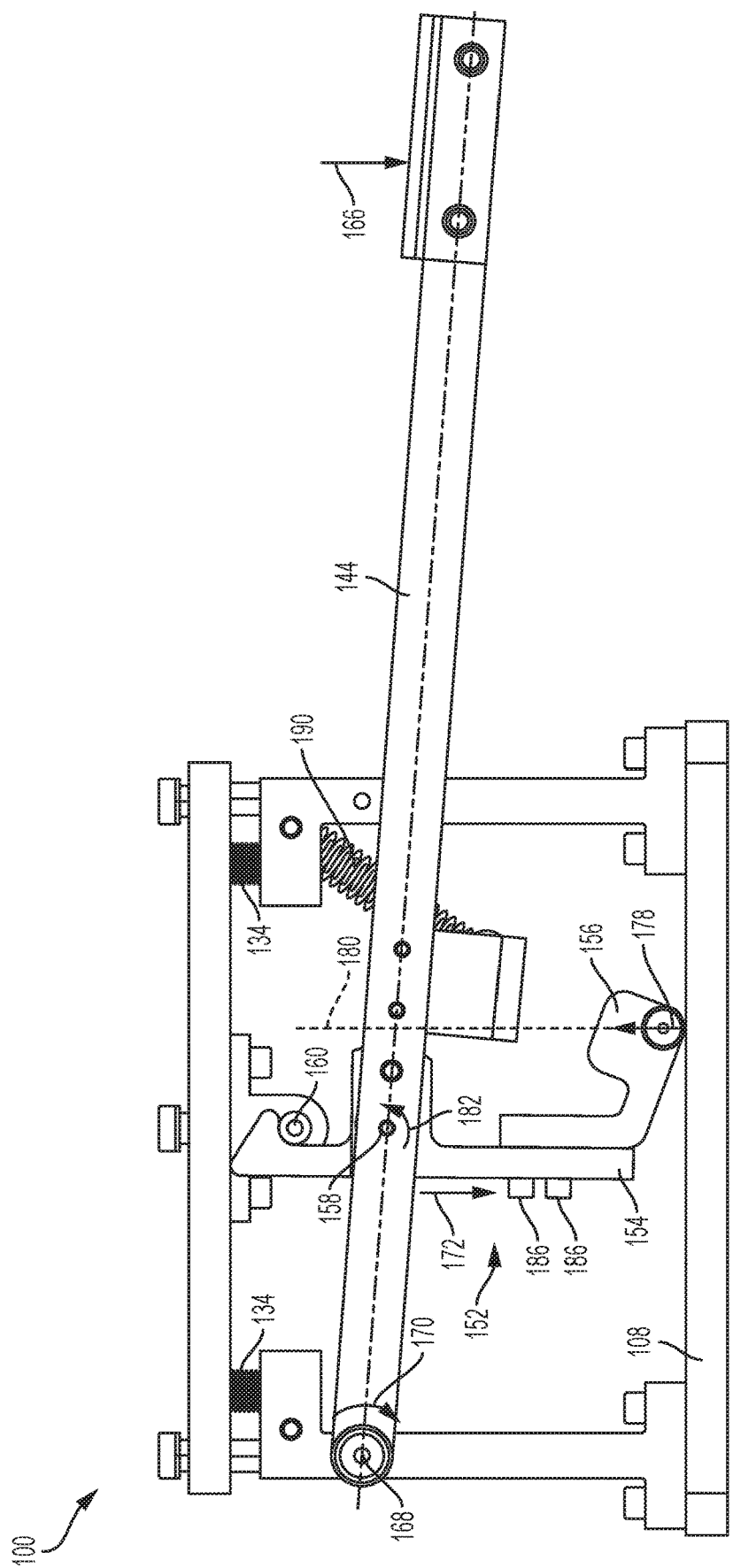
FIG. 4 is a side elevation view of the test stand of FIG. 1 with a support leg of the test stand omitted in order to show a latch mechanism, showing the test stand in an intermediate configuration where a lever has been depressed but the latch mechanism has not been released.

FIG. 4 is a side elevation view of test stand 100 with a support leg of the test stand again omitted in order to show latch mechanism 152. FIG. 4 shows test stand 100 in a loaded configuration where test plate 104 has moved toward support base 102 relative to the start configuration, lever 144 has rotated in direction 170 around second rotation axis 168 relative to the start configuration, spring(s) 134 are compressed relative to the start configuration, latch mechanism 152 has moved in downward direction 172 relative to the start configuration, but latch mechanism 152 has not released the test plate. The loaded configuration shown in FIG. 4 has latch extension 156 just making contact with base plate 108.

Latch extension 156 may be configured to receive a contact force 178 upon sufficient rotation of lever 144 relative to support base 102. Contact force 178 may be oriented so that a linear extension of the contact force, shown at dashed line 180, does not intersect the first rotation axis 158 between latch mechanism 152 and lever 144. Contact force 178 may be a normal force applied to the latch extension by base plate 108.

Latch extension 156 may be configured to induce rotation of hook portion 154 under sufficient rotation of lever 144 relative to support base 102. Contact force 178 exerted on the latch extension may result in a torque applied to latch mechanism 152 which may result in rotation of the latch mechanism relative to lever 144 around first rotation axis 158 in a direction indicated by curved arrow 182.

Latch extension 156 may be adjustably coupled to hook portion 154. In particular, the relative positions of the latch extension and the hook portion may be adjustable. In the embodiment shown in FIGS. 1-5, hook portion includes a long aperture 184, seen best in FIG. 2, and the latch extension is coupled to the hook portion via a pair of bolts 186 passing through the long aperture. By changing the position of bolts 186 within the long aperture, the latch extension may be positioned closer to or farther from, for example, post 160. When the latch extension is positioned relatively closer to the post, lever 144 may need to be depressed relatively more in order for the latch extension to first make contact with the support base. When the latch extension is positioned relatively farther from the post, the lever may need to be depressed relatively less in order for the latch extension to first make contact with the support base. Altering the orientation of the lever at which the latch mechanism first makes contact with the support base may change the predetermined position at which the latch mechanism releases test plate 104. That is, the latch extension may be adjusted relative to the hook portion in order to change the predetermined position where the test plate is released.

Figure 5:
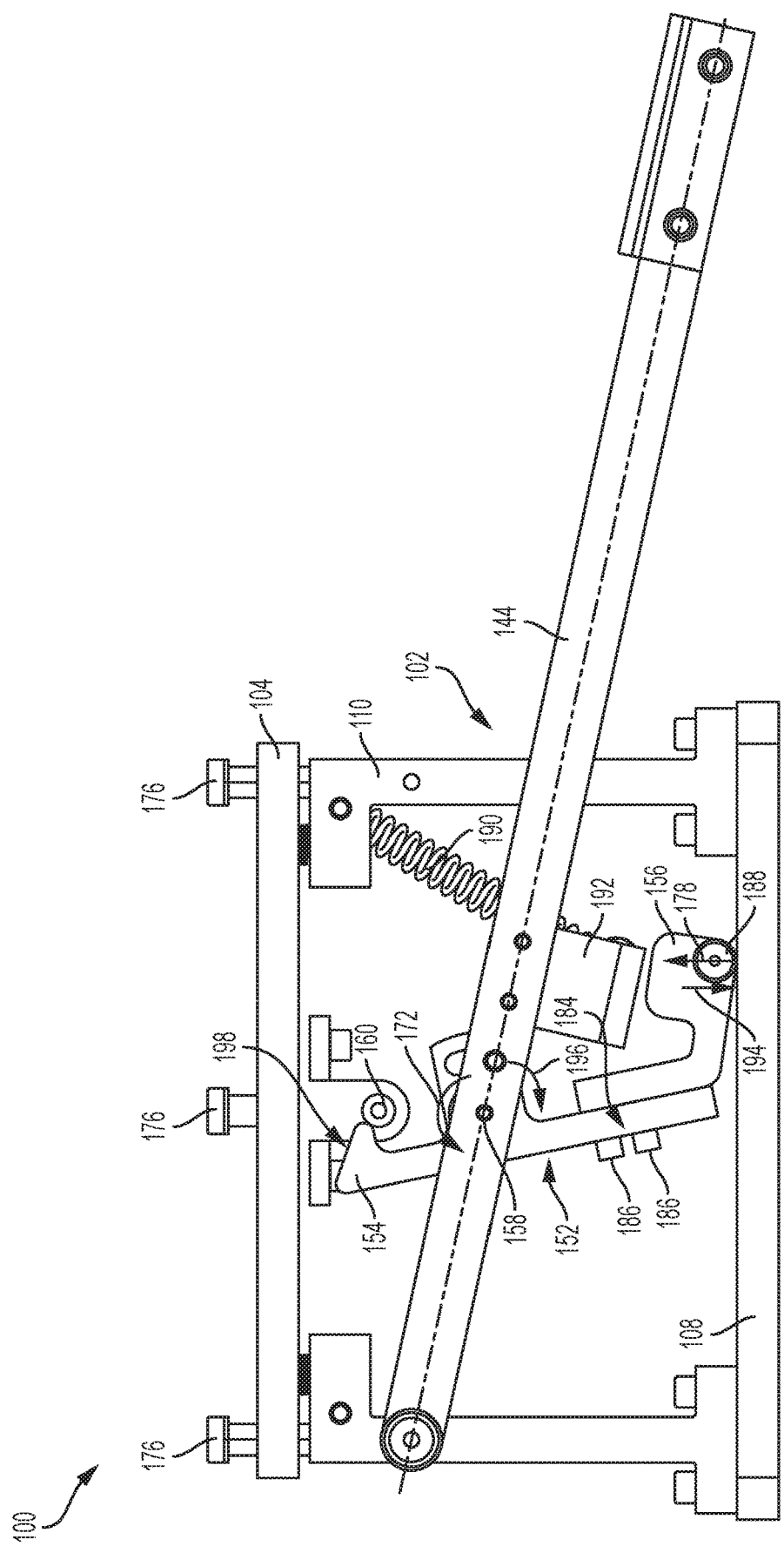
FIG. 5 is a side elevation view of the test stand of FIG. 1 with a support leg of the test stand omitted in order to show a latch mechanism, showing the test stand in a release configuration where the latch mechanism has released a test plate of the test stand and where the test plate is free to move vertically at the urging of a spring.

FIG. 5 is a side elevation view of test stand 100, again with a support leg of the test stand omitted in order to show a latch mechanism. FIG. 5 shows test stand 100 in a release configuration wherein latch mechanism 152 is uncoupled from test plate 104, thereby allowing the test plate to move at the urging of the one or more springs. FIG. 5 shows the test plate at just the moment of release when the test plate has not yet had time to move vertically at the urging of the springs.

The release configuration shown in FIG. 5 may be one of a plurality of release configurations of test stand 100, with each of the plurality of release configurations associated with a different configuration of latch extension 156 of the latch mechanism 152. For example, if latch extension 156 is coupled to hook portion 154 at a position lower than that shown in FIG. 5, then the latch mechanism may have just released test plate 104 at a predetermined location that is higher than that shown in FIG. 5.

Latch mechanism 152 may be configured to release test plate 104 upon rotation of hook portion 154. That is, upon sufficient rotation of the hook portion about first rotation axis 158 in direction 172, the hook portion may release or disengage post 160 coupled to test plate 104. What amounts to sufficient rotation of the hook portion may be altered by adjusting the relative positions of the hook portion and latch extension 156 by, for example, moving bolts 186 within long aperture 184. Altering the rotation required for the latch mechanism to release the test plate may include changing the predetermined position of the test plate relative to the support base at which the test plate is released.

Latch extension 156 may include a roller 188 configured to receive contact force 178. Roller 188 may roll along base plate 108 as latch mechanism 152 rotates around first rotation axis 158.

As described above, after being released by the release mechanism 152, test plate 104 may be configured to move relative to support base 102 at the urging of the biasing member until said movement is halted by stop member 176 of the support base. The movement of the test plate, and subsequent halting of movement, may induce excitations and/or oscillations of any tunable mass damper which is fixedly secured to the test plate.

In some examples, the one or plurality of springs, seen at 134 in FIGS. 2-4, may have an effective spring constant that is greater than an effective spring constant of a tunable mass damper fixed to test plate 104, such as TMD 106 shown in FIG. 1. Configuring the effective spring constants of the test plate in such a manner may allow the test plate to remain stationary relative to support base 102 after the motion of the test plate relative to the support base has been halted by stop member 176 but before the oscillations of the TMD have ceased. This may improve the accuracy of any measurements designed to characterize the oscillation properties of the TMD.

Test stand 100 may include a return spring 190, seen also in FIGS. 3 and 4. Return spring 190 may be configured to facilitate returning lever 144 to the start configuration shown in FIG. 3. Return spring may be coupled to support base 102, for example at a support leg 110 and to lever 144, perhaps via a bracket 192. In some embodiments, return spring 190 may be omitted and lever 144 returned to the start configuration manually by a user of test stand 100.

Latch extension 156 may have sufficient mass to return hook portion 154 to a vertical orientation after releasing test plate 104 through a gravitational torque acting on the mass of the latch extension. After test plate 104 has been released and returned to the first position shown in FIG. 3 and lever 144 has been raised sufficiently relative to FIG. 5 so that the latch extension 156 no longer contacts base plate 108, a gravitational force 194 acting on the latch extension, i.e. a weight of the latch extension, may be sufficient to rotate the hook portion in direction 196 around first rotation axis 158 until the hook portion is in a vertical orientation as shown in FIG. 3.

Hook portion 154 of latch mechanism 152 may include an upper angled surface 198 configured to facilitate re-engagement between the hook portion and post 160 as lever 144 returns to the start configuration. If hook portion 154 is in a vertical orientation as lever 144 moves vertically on its return to the start configuration, upper angled surface 198 may contact post 160 and this contact may deflect the hook portion to the side, and rotate the hook portion, until the upper angled surface has moved past the post. The gravitational torque applied to the latch mechanism by the weight 194 of latch extension 156 may then rotate the hook portion back to a vertical orientation and into engagement with the post.

Example 2

Figure 6:
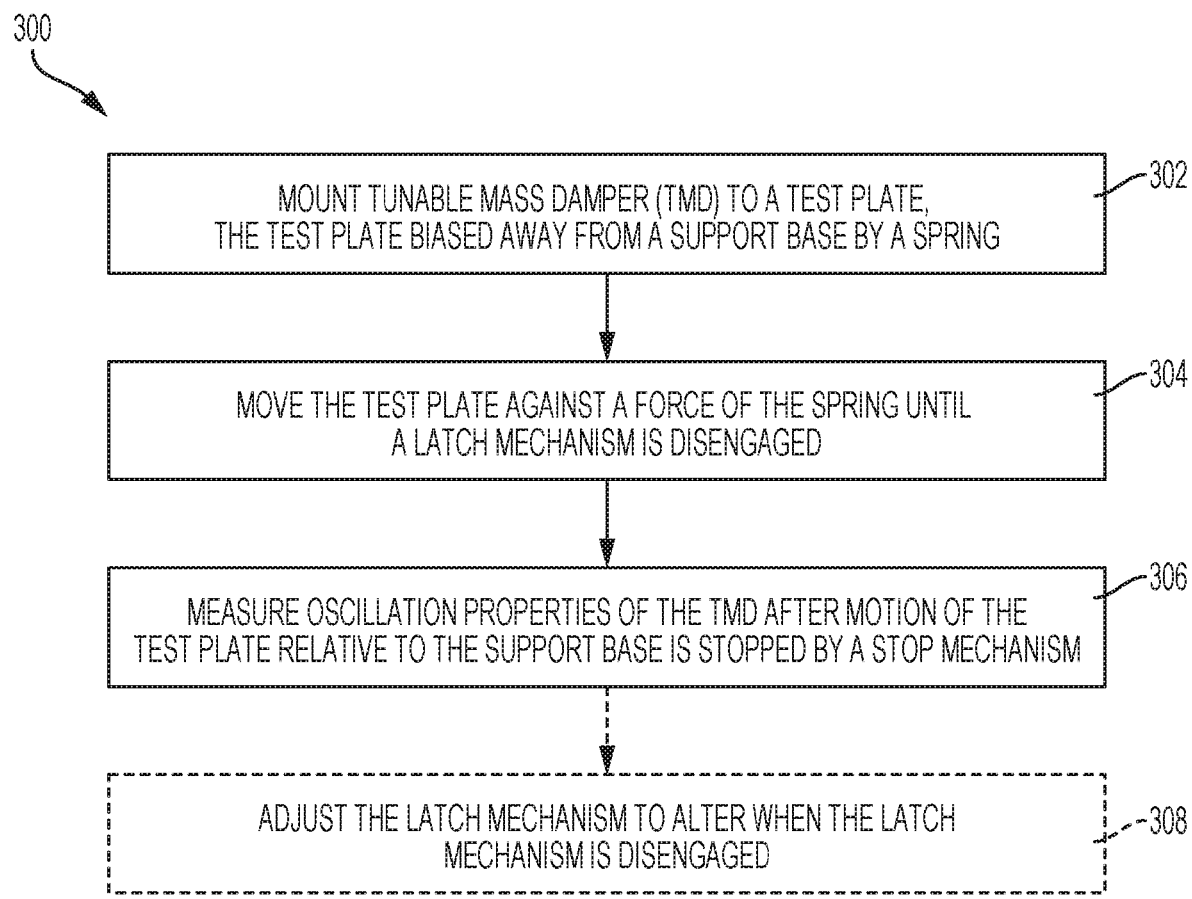
FIG. 6 is a flow chart illustrating a method of characterizing the oscillation properties of a tunable mass damper.

This example describes an illustrative method of characterizing the oscillation properties of a tunable mass damper, which may be used in conjunction with any of the apparatuses or systems described herein; see FIG. 6.

FIG. 6 depicts multiple steps of a method, generally indicated at 300 of characterizing the oscillation properties of a tunable mass damper. Method 300 may be used in conjunction with any of the test stands depicted in and described in reference to FIGS. 1-5 and 8. Although various steps of method 300 are described below and depicted in FIG. 6, the steps need not necessarily all be performed, in some cases may be performed in a different order than the order shown, in some cases may be performed more than once, and in some cases may be performed simultaneously.

Method 300 may include a step 302 of mounting a tunable mass damper (TMD) to a test plate, the test plate being biased away from a support base by a spring. In some examples, mounting a TMD to a test plate may include fixedly securing the TMD to a top side of the test plate. Mounting the TMD to the test plate may include coupling the TMD to the plate via an appropriate fastener or fasteners, such as bolts, screws, rivets, brackets, clamps, or pins, etc., and/or the like.

In some examples, mounting a TMD to a test plate may include connecting a position detector associated with the TMD to a computing device. The position detector may be formed integrally with the TMD and may be configured to monitor the position of a mass inside the TMD. A position sensor may monitor position of the mass, for example, by emitting sound or light waves toward the mass and detecting reflected sound or light waves from the mass. The mass may move within the TMD after having been imparted with kinetic energy.

Method 300 may include a step 304 of moving the test plate against a force of the spring until a latch mechanism is disengaged. The latch mechanism may be disengaged at a predetermined separation distance between the test plate and the support base. In examples where the spring is disposed between the test plate and the support base, moving the test plate against the urging of the spring may include compressing the spring between the test plate and the support base. Compressing the spring may store potential energy within the spring.

In some examples, moving the test plate against a force of the spring may include activating a lever coupled to the test plate via the latch mechanism. Activating a lever may include a user manually exerting a force on the lever by pushing or pulling on an end of the lever. In other examples, activating a lever may include mechanically applying a force to the lever by a piston or other force transferring means.

The latch mechanism may automatically release the test plate at the predetermined separation distance. The test plate may be moved against the force of the spring and then released a number of times in order to characterize the oscillation properties of the TMD. Automatically releasing the test plate via the latch mechanism may increase the accuracy and/or precision of the characterization as the process may be highly repeatable.

After the latch mechanism is disengaged from the test plate, the test plate may move relative to the support base at the urging of the spring. That is, some of the potential energy stored in the spring may be converted into kinetic energy of the test plate, kinetic energy of the TMD mounted to the test plate, kinetic energy of the mass within the TMD, and potential energy of any springs within the TMD, as well as to heat and sound. The motion of the test plate relative to the support base may be stopped by a stop mechanism of the support base.

The mass within the TMD may continue to oscillate after the motion of the test plate relative to the support base has been stopped by the stop mechanism. The mass within the TMD may exhibit damped oscillation as oscillation energy of the mass and spring(s) of the TMD is lost to a damping medium of the TMD.

The latch mechanism may be configured to automatically recouple the lever to the test plate after the motion of the test plate relative to the support base is stopped by the stop mechanism and the lever is returned to a start position. In the illustrative embodiment shown in FIGS. 1-5, latch mechanism 152 may recouple to test plate 104 via a gravitational torque applied to the latch mechanism by the weight 194 of latch extension 156 and/or a deflection of hook portion 154 around post 160 via upper angled surface 198 of the hook portion. In other examples, the latch mechanism may be configured to manually recouple the lever to the test plate. Once the lever has been recoupled to the test plate, step 304 may be repeated.

In some examples, latch mechanism may be adjustable so as to alter the predetermined separation distance between the test plate and the support base at which the latch mechanism is disengaged. Altering the predetermined separation distance at which the test plate is released may alter the energy imparted to the TMD upon the release, subsequent movement, and subsequent stopping of the test plate. By adjusting the latch mechanism as user may adjust the energy of the oscillations excited in the TMD.

Method 300 may include a step 306 of measuring oscillation properties of the TMD after motion of the test plate relative to the support base is topped by the stop mechanism. Measuring oscillation properties of the tunable mass damper may include monitoring a position of a mass of the TMD over time. Monitoring a position of a mass of the TMD over time may include monitoring the position of the mass with a position detector connected to a computing device. The connection between the position detector and the computing device may be a wired or wireless connection.

Measuring the oscillation properties of the tunable mass damper may include measuring at least one of an oscillation frequency of the TMD and a characteristic damping time of the TMD. Determining one or both of these properties may include analyzing data from the position detector with the computing device. In some examples, the computing device may include a program configured to automatically determine the oscillation properties of the TMD. In some examples, a user may determine the oscillation properties of the TMD by using the computing device.

In some examples, one or both of steps 304 and 306 of method 300 may be performed repeatedly. That is, the oscillation properties of the TMD may be measured a number of times which may improve the accuracy and/or precision of the determined measurements.

Method 300 may optionally include a step 308 of adjusting the latch mechanism to alter when the latch mechanism is disengaged. Adjusting the latch mechanism may alter the predetermined separation distance between the test plate and the support base at which the latch mechanism is disengaged. As described above, altering the predetermined separation distance may alter the oscillation energy of the TMD.

Step 308 may be considered to be part of step 306. That is, adjusting the oscillation energy of the TMD may be part of measuring the oscillation properties of the TMD. Step 308 may be performed a number of times, which may provide a number of different oscillation energies to study. In some examples, by repeating steps 306 and 308, it may be determined that one or more of the oscillation properties of the TMD depend upon the oscillation energy of the TMD. It would be advantageous to have as complete a knowledge of the oscillation properties of the TMD as is possible before installing the TMD into a wind tunnel model for wind tunnel testing.

In some examples, the latch mechanism may include a hook portion and a latch extension adjustably coupled to the hook portion. The hook portion may be configured to be releasably coupled to the test plate and the latch extension may be configured to induce rotation of the latch mechanism. Adjusting the latch mechanism may include changing the relative disposition of the latch mechanism and the hook portion.

Example 3

Figure 7:
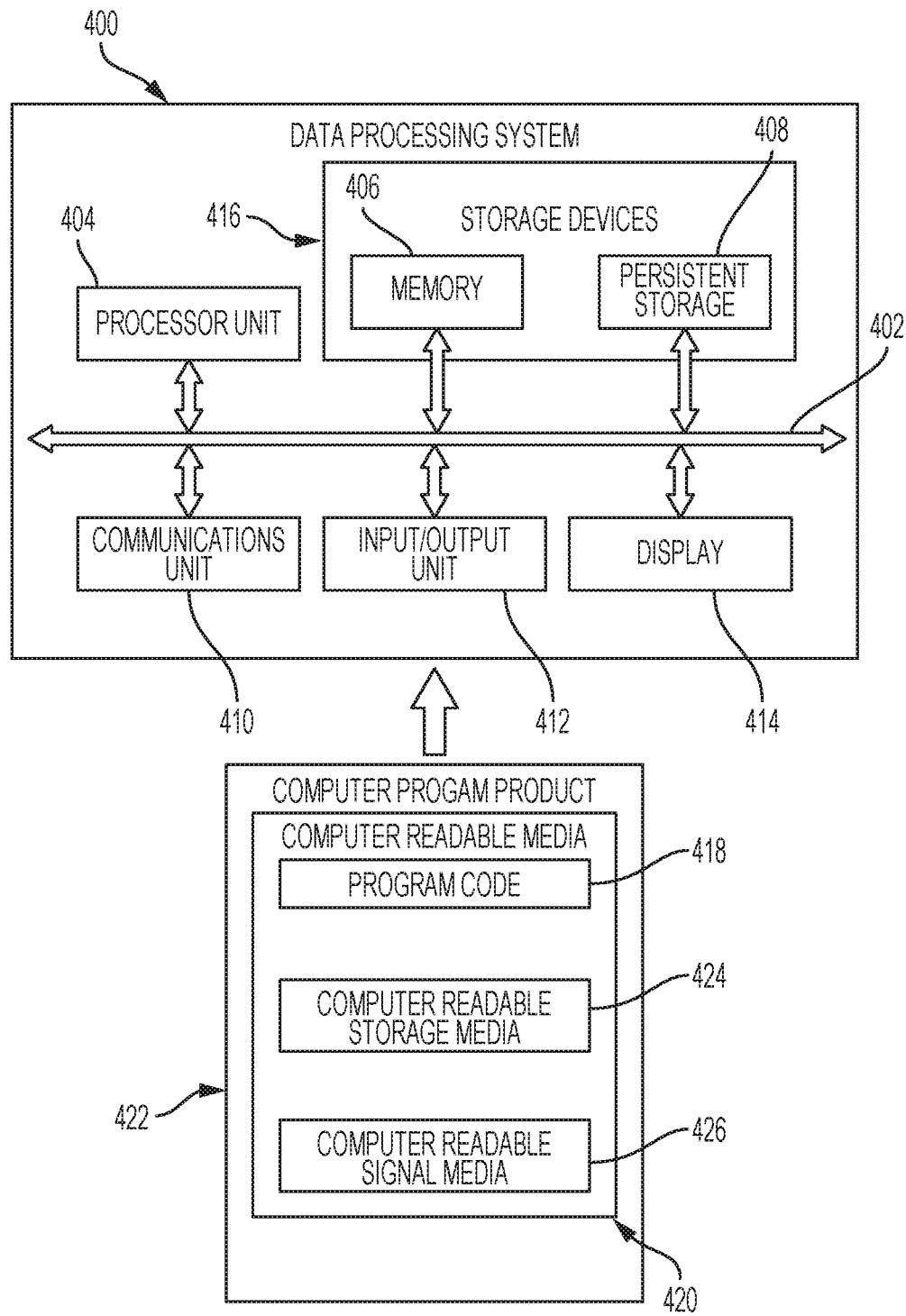
FIG. 7 is a schematic diagram of various components of an illustrative data processing system.

This examples describes an illustrative computing device; see FIG. 7.

As shown in FIG. 7, this example describes a data processing system 400 in accordance with aspects of the present disclosure. In this example, data processing system 400 is an illustrative data processing system suitable for implementing aspects of a system for testing a tunable mass damper. More specifically, in some examples, devices that are embodiments of data processing systems (e.g., smartphones, tablets, personal computers, oscilloscopes) may receive data from a detector, the data relating to the oscillation properties or characteristics of a tunable mass damper. The devices that are embodiments of data processing systems may identify or help to identify one or more oscillation characteristics of the tunable mass damper from the received data.

In this illustrative example, data processing system 400 includes communications framework 402. Communications framework 402 provides communications between processor unit 404, memory 406, persistent storage 408, communications unit 410, input/output (I/O) unit 412, and display 414. Memory 406, persistent storage 408, communications unit 410, input/output (I/O) unit 412, and display 414 are examples of resources accessible by processor unit 404 via communications framework 402.

Processor unit 404 serves to run instructions that may be loaded into memory 406. Processor unit 404 may be a number of processors, a multi-processor core, or some other type of processor, depending on the particular implementation. Further, processor unit 404 may be implemented using a number of heterogeneous processor systems in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and other suitable information either on a temporary basis or a permanent basis.

Storage devices 416 also may be referred to as computer-readable storage devices in these examples. Memory 406, in these examples, may be, for example, a random access memory or any other suitable volatile or non-volatile storage device. Persistent storage 408 may take various forms, depending on the particular implementation.

For example, persistent storage 408 may contain one or more components or devices. For example, persistent storage 408 may be a hard drive, a flash memory, a rewritable optical disk, a rewritable magnetic tape, or some combination of the above. The media used by persistent storage 408 also may be removable. For example, a removable hard drive may be used for persistent storage 408.

Communications unit 410, in these examples, provides for communications with other data processing systems or devices. In these examples, communications unit 410 is a network interface card. Communications unit 410 may provide communications through the use of either or both physical and wireless communications links.

Input/output (I/O) unit 412 allows for input and output of data with other devices that may be connected to data processing system 400. For example, input/output (I/O) unit 412 may provide a connection for user input through a keyboard, a mouse, and/or some other suitable input device. Further, input/output (I/O) unit 412 may send output to a printer. Display 414 provides a mechanism to display information to a user.

Instructions for the operating system, applications, and/or programs may be located in storage devices 416, which are in communication with processor unit 404 through communications framework 402. In these illustrative examples, the instructions are in a functional form on persistent storage 408. These instructions may be loaded into memory 406 for execution by processor unit 404. The processes of the different embodiments may be performed by processor unit 404 using computer-implemented instructions, which may be located in a memory, such as memory 406.

These instructions are referred to as program instructions, program code, computer usable program code, or computer-readable program code that may be read and executed by a processor in processor unit 404. The program code in the different embodiments may be embodied on different physical or computer-readable storage media, such as memory 406 or persistent storage 408.

Program code 418 is located in a functional form on computer-readable media 420 that is selectively removable and may be loaded onto or transferred to data processing system 400 for execution by processor unit 404. Program code 418 and computer-readable media 420 form computer program product 422 in these examples. In one example, computer-readable media 420 may be computer-readable storage media 424 or computer-readable signal media 426.

Computer-readable storage media 424 may include, for example, an optical or magnetic disk that is inserted or placed into a drive or other device that is part of persistent storage 408 for transfer onto a storage device, such as a hard drive, that is part of persistent storage 408. Computer-readable storage media 424 also may take the form of a persistent storage, such as a hard drive, a thumb drive, or a flash memory, that is connected to data processing system 400. In some instances, computer-readable storage media 424 may not be removable from data processing system 400.

In these examples, computer-readable storage media 424 is a physical or tangible storage device used to store program code 418 rather than a medium that propagates or transmits program code 418. Computer-readable storage media 424 is also referred to as a computer-readable tangible storage device or a computer-readable physical storage device. In other words, computer-readable storage media 424 is non-transitory.

Alternatively, program code 418 may be transferred to data processing system 400 using computer-readable signal media 426. Computer-readable signal media 426 may be, for example, a propagated data signal containing program code 418. For example, computer-readable signal media 426 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 418 may be downloaded over a network to persistent storage 408 from another device or data processing system through computer-readable signal media 426 for use within data processing system 400. For instance, program code stored in a computer-readable storage medium in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide architectural limitations to the manner in which different embodiments may be implemented. The different illustrative embodiments may be implemented in a data processing system including components in addition to and/or in place of those illustrated for data processing system 400. Other components shown in FIG. 7 can be varied from the illustrative examples shown. The different embodiments may be implemented using any hardware device or system capable of running program code. As one example, data processing system 400 may include organic components integrated with inorganic components and/or may be comprised entirely of organic components excluding a human being. For example, a storage device may be comprised of an organic semiconductor.

In another illustrative example, processor unit 404 may take the form of a hardware unit that has circuits that are manufactured or configured for a particular use. This type of hardware may perform operations without needing program code to be loaded into a memory from a storage device to be configured to perform the operations.

For example, when processor unit 404 takes the form of a hardware unit, processor unit 404 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, a field programmable logic array, a field programmable gate array, and other suitable hardware devices. With this type of implementation, program code 418 may be omitted, because the processes for the different embodiments are implemented in a hardware unit.

In still another illustrative example, processor unit 404 may be implemented using a combination of processors found in computers and hardware units. Processor unit 404 may have a number of hardware units and a number of processors that are configured to run program code 418. With this depicted example, some of the processes may be implemented in the number of hardware units, while other processes may be implemented in the number of processors.

In another example, a bus system may be used to implement communications framework 402 and may be comprised of one or more buses, such as a system bus or an input/output bus. Of course, the bus system may be implemented using any suitable type of architecture that provides for a transfer of data between different components or devices attached to the bus system.

Additionally, communications unit 410 may include a number of devices that transmit data, receive data, or both transmit and receive data. Communications unit 410 may be, for example, a modem or a network adapter, two network adapters, or some combination thereof. Further, a memory may be, for example, memory 406, or a cache, such as that found in an interface and memory controller hub that may be present in communications framework 402.

The flowcharts and block diagrams described herein illustrate the architecture, functionality, and operation of possible implementations of systems, methods, and computer program products according to various illustrative embodiments. In this regard, each block in the flowcharts or block diagrams may represent a module, segment, or portion of code, which comprises one or more executable instructions for implementing the specified logical function or functions. It should also be noted that, in some alternative implementations, the functions noted in a block may occur out of the order noted in the drawings. For example, the functions of two blocks shown in succession may be executed substantially concurrently, or the functions of the blocks may sometimes be executed in the reverse order, depending upon the functionality involved.

Example 4

Figure 8:
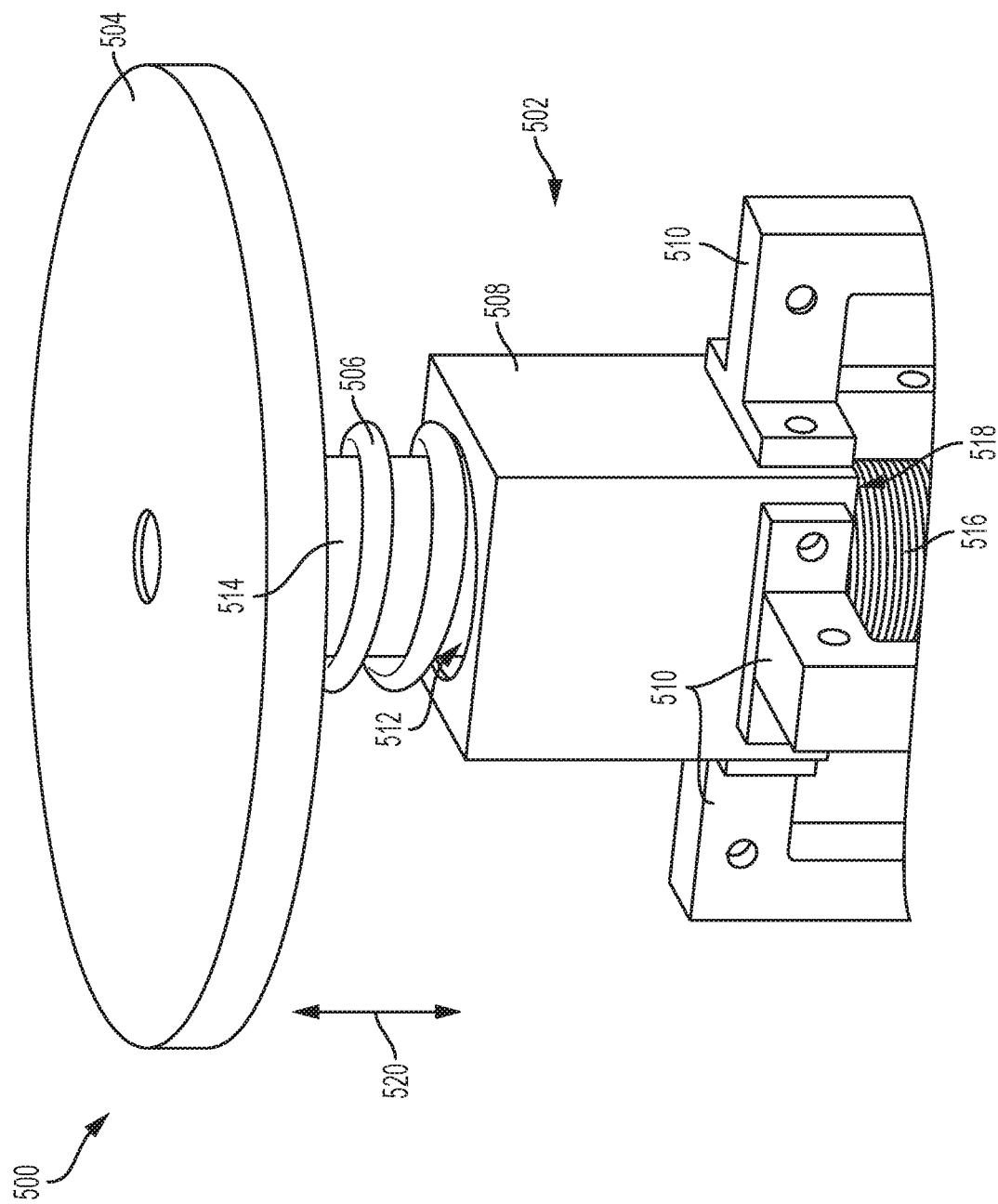
FIG. 8 is an upper trimetric view of another illustrative embodiment of a test stand for characterization of a tunable mass damper.

This examples describes another illustrative test stand for characterization of a tunable mass damper; see FIG. 8.

FIG. 8 is a trimetric view of a test stand, generally indicated at 500. Test stand 500 may be similar to test stand 100 described above and description of various common features and benefits of test stand 100 will not be repeated in their entirety.

Test stand 500 may include a support base 502, a test plate 504, and a spring 506. Test stand 500 may further include a loading member such as a lever and a latch mechanism or a release mechanism as described above. The loading member and latch or release mechanism of test stand 500 may be substantially similar to the loading member and latch or release mechanism of test stand 100 described above, and are not shown in FIG. 8.

Support base 502 may include a central support block 508, and a plurality of support legs 510. Support block 508 may have a central passage 512 aligned along a direction of movement of test plate 504 relative to support base 502. Central passage 512 may be configured to receive an alignment post 514 coupled to the test plate. Alignment post 514 may extend from the test plate, through central passage 512, and may be coupled to a collar 516 on an opposite end of the central passage from the test plate.

Test plate 504 may be coupled to a latch or release mechanism through alignment post 514, and the alignment post may be coupled to a loading member via the latch or release mechanism. As the loading member moves test plate 504 toward support base 502, spring 506 may be compressed. Upon release of the test plate by the latch mechanism, test plate 504 may move upward relative to support base 502 until motion of the test plate is halted by a stop mechanism 518 of the support base. In the embodiment shown in FIG. 8, stop mechanism 518 may include an underside of support block 508 and the motion of the test plate and the alignment post relative to the support base may be halted by contact between collar 516 and the underside of the support block.

Reception of alignment post 514 within central passage 512 of support block 508 may prevent or inhibit transverse or angular motion of the test plate relative to a vertical direction 520. Test stand 500 may resist wobbling of the test plate, even in cases where a tunable mass damper is secured to test plate 504 at locations other than the center of the test plate. That is, by motion of the alignment post within the central passage, test stand 500 may be a self-aligning device.

Example 5

This section describes additional aspects and features of embodiments, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A1. A test stand for characterization of a tunable mass damper, the test stand comprising:

a support base including a stop member;

a test plate coupled to the support base, the test plate configured to move relative to the support base and to fixedly carry a tunable mass damper;

a spring coupled to the support base and the test plate;

a lever configured to be releasably coupled to the test plate and to move the test plate relative to the support base against the urging of the spring; and a latch mechanism configured to release the test plate from the lever when the test plate is at a predetermined position relative to the support base;

wherein the test plate moves at the urging of the spring after being released by the latch mechanism; and wherein the motion of the test plate, after the test plate has been released by the latch mechanism, is halted by the stop member of the support base.

A2. The test stand of paragraph A1, wherein the test plate has a first position relative to the support base and the test plate is held in the first position against the stop member, prior to activation of the lever, at the urging of the spring.

A3. The test stand of paragraph A2, wherein the test plate has an aperture and the support base includes a bolt having a shaft portion and a head portion, the shaft portion extending through the aperture and the head portion forming the stop member, and wherein at least a portion of the aperture is sized to (a) receive the shaft portion of the bolt and (b) not receive the head portion of the bolt.

A4. The test stand of paragraph A1, wherein the support base includes a plurality of support legs and each support leg of the plurality of support legs includes a bolt extending from a top end of the support leg, the bolt having a shaft portion and a head portion at a distal end of the bolt relative to the support leg.

A5. The test stand of paragraph A4, wherein the test plate has a plurality of apertures and each shaft portion of a bolt associated with one of the plurality of support legs is configured to pass through an aperture of the plurality of apertures in the test plate.

A6. The test stand of paragraph A5, wherein the spring is one of a plurality of springs with each spring of the plurality of springs disposed between the top end of an associated support leg and the test plate.

A7. The test stand of paragraph A6, wherein the plurality of springs have an effective spring constant that is greater than an effective spring constant of the tunable mass damper.

A8. The test stand of paragraph A1, wherein the test plate includes a post coupled to a bottom side of the test plate, the post configured to be releasably engaged by the latch mechanism.

A9. The test stand of paragraph A8, wherein the post is proximate a center of the bottom side of the test plate.

A10. The test stand of paragraph A1, wherein the lever is rotatably coupled to the support base.

A11. The test stand of paragraph A1, wherein the lever is rotatably coupled to the support base at a first end of the lever, the lever is configured to have an activation force applied to a second end of the lever opposite the first end, and the lever is configured to be releasably coupled to the test plate at a position intermediate the first and second ends of the lever.

A12. The test stand of paragraph A1, wherein the test stand has a start configuration wherein the lever is coupled to the test plate via the latch mechanism and a release configuration wherein the latch mechanism is uncoupled from the test plate, thereby allowing the test plate to move at the urging of the spring.

A13. The test stand of paragraph A12, wherein the release configuration is one of a plurality of release configurations, with each of the plurality of release configurations associated with a different configuration of a latch extension of the latch mechanism.

A14. The test stand of paragraph A1, wherein the latch mechanism includes a hook portion and a latch extension, the hook portion being rotatably coupled to the lever and the latch extension adjustably coupled to the hook portion.

A15. The test stand of paragraph A14, wherein the latch extension is configured to induce rotation of the hook portion under sufficient rotation of the lever relative to the support base.

A16. The test stand of paragraph A15, wherein the latch mechanism is configured to release the test plate upon rotation of the hook portion.

A17. The test stand of paragraph A15, wherein the latch extension is configured to receive a contact force upon sufficient rotation of the lever relative to the support base, the contact force oriented so that a linear extension of the contact force does not intersect a rotation axis between the latch mechanism and the lever.

A18. The test stand of paragraph A17, wherein the latch extension has sufficient mass to return the hook portion to a vertical orientation after releasing the test plate through a gravitational torque acting on the mass of the latch extension.

A19. The test stand of paragraph A14, wherein the latch extension can be adjusted relative to the hook portion in order to change the predetermined position where the test plate is released.

B1. A method of characterizing the oscillation properties of a tunable mass damper, the method comprising:
mounting a tunable mass damper to a test plate, the test plate being biased away from a support base by a spring;
moving the test plate against a force of the spring until a latch mechanism is disengaged at a predetermined separation distance between the test plate and the support base; and
measuring oscillation properties of the tunable mass damper after motion of the test plate relative to the support base is stopped by a stop mechanism.

B2. The method of paragraph B1, wherein moving the test plate against a force of the spring includes activating a lever coupled to the test plate via the latch mechanism.

B3. The method of paragraph B2, wherein the latch mechanism is configured to automatically recouple the lever to the test plate after the motion of the test plate relative to the support base is stopped by the stop mechanism and the lever is returned to a start position.

B4. The method of paragraph B1, wherein the latch mechanism is adjustable so as to alter the predetermined separation distance between the test plate and the support base at which the latch mechanism is disengaged.

B5. The method of paragraph B1, further comprising:
adjusting the latch mechanism so as to alter the predetermined separation distance between the test plate and the support base at which the latch mechanism is disengaged.

B6. The method of paragraph B5, wherein the latch mechanism includes a hook portion and a latch extension adjustably coupled to the hook portion, the hook portion configured to be releasably coupled to the test plate and the latch extension configured to induce rotation of the latch mechanism, and wherein adjusting the latch mechanism includes changing the relative disposition of the latch extension and the hook portion.

B7. The method of paragraph B1, wherein mounting a tunable mass damper to a test plate includes fixedly securing the tunable mass damper to a top side of the test plate.

B8. The method of paragraph B1, wherein mounting a tunable mass damper to a test plate includes connecting a position detector associated with the tunable mass damper to a computing device.

B9. The method of paragraph B1, wherein measuring oscillation properties of the tunable mass damper includes measuring at least one of an oscillation frequency of the tunable mass damper and a characteristic damping time of the tunable mass damper.

B10. The method of paragraph B1, wherein measuring oscillation properties of the tunable mass damper includes monitoring a position of a mass of the tunable mass damper over time.

B11. The method of paragraph B10, wherein monitoring a positon of a mass of the tunable mass damper over time includes monitoring the position of the mass with a position detector connected to a computing device.

C1. A system for testing a tunable mass damper, the system comprising:
a test stand configured to provide a repeatable impulse to the tunable mass damper, the test stand including:
a support base;
a test plate coupled to the support base, the test plate configured to move relative to the support base and to fixedly carry a tunable mass damper;
a biasing member urging the test plate away from the support base;
a loading member configured to move the test plate relative to the support base against the urging of the biasing member; and
a release mechanism configured to release the test plate from the loading member when the test plate is at a predetermined position relative to the support base; and
a computing device including:
a processor;
a memory; and
a program including a set of instructions stored in the memory and executable by the processor to:
receive data from a detector associated with the tunable mass damper; and identify one or more oscillation characteristics of the tunable mass damper based on the received data, the one or more oscillation characteristics including at least one of an oscillation frequency of the tunable mass damper and a characteristic damping time of the tunable mass damper.

C2. The system of paragraph C1, wherein the predetermined position at which the test plate is released from the loading member is adjustable via the release mechanism.

C3. The system of paragraph C2, wherein the release mechanism has a hook portion and a latch extension adjustably coupled to the hook portion, the hook portion configured to be releasably coupled to the test plate and the latch extension configured to induce rotation of the hook portion.

C4. The system of paragraph C1, wherein the test plate is configured to move relative to the support base at the urging of the biasing member after being released by the release mechanism until said movement is halted by a stop mechanism of the support base.

C5. The system of paragraph C4, wherein the movement and subsequent halting of the test plate excites oscillations of the tunable mass damper.

C6. The system of paragraph C1, wherein the detector associated with the tunable mass damper is a position detector integrated into the tunable mass damper so as to monitor the position of a mass within the tunable mass damper over time.

Advantages, Features, Benefits

The different embodiments of the test stands described herein provide several advantages over known solutions for repeatably imparting an impulse to a tunable mass damper for purposes of characterizing the tunable mass damper. For example, the illustrative embodiments of test stands described herein allow for a test plate to be loaded against a spring and released automatically at a predetermined position. Additionally, and among other benefits, illustrative embodiments of the test stands described herein allow the predetermined position at which the test plate is released to be adjusted. Additionally, and among other benefits, illustrative embodiments of the test stands described herein allow the test stand to automatically reset itself to a start configuration after a test of a tunable mass damper has been performed. No known system or device can perform these functions, particularly in such a simple, inexpensive, and compact design. Thus, the illustrative embodiments described herein are particularly useful for characterization of tunable mass dampers for use in wind tunnel models during wind tunnel testing. However, not all embodiments described herein provide the same advantages or the same degree of advantage.

CONCLUSION

The disclosure set forth above may encompass multiple distinct inventions with independent utility. Although each of these inventions has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only, and do not constitute a characterization of any claimed invention. The subject matter of the invention(s) includes all novel and nonobvious combinations and subcombinations of the various elements, features, functions, and/or properties disclosed herein. The following claims particularly point out certain combinations and subcombinations regarded as novel and nonobvious. Invention(s) embodied in other combinations and subcombinations of features, functions, elements, and/or properties may be claimed in applications claiming priority from this or a related application. Such claims, whether directed to a different invention or to the same invention, and whether broader, narrower, equal, or different in scope to the original claims, also are regarded as included within the subject matter of the invention(s) of the present disclosure.

I claim:

1. A test stand for characterization of a tunable mass damper, the test stand comprising:
    a support base including a stop member;
    a test plate coupled to the support base, the test plate configured to move relative to the support base and to fixedly carry a tunable mass damper;
    a spring coupled to the support base and the test plate;
    a lever configured to be releasably coupled to the test plate and to move the test plate relative to the support base against the urging of the spring; and
    a latch mechanism configured to release the test plate from the lever when the test plate is at a predetermined position relative to the support base;
    wherein the test plate moves at the urging of the spring after being released by the latch mechanism; and
    wherein motion of the test plate, after the test plate has been released by the latch mechanism, is halted by the stop member of the support base.

2. The test stand of claim 1, wherein the test plate includes a post coupled to a bottom side of the test plate, the post configured to be releasably engaged by the latch mechanism.

3. The test stand of claim 1, wherein the support base includes a plurality of support legs and each support leg of the plurality of support legs includes a bolt extending from a top end of the support leg, the bolt having a shaft portion and a head portion, the head portion located at a distal end of the bolt relative to the support leg.

4. The test stand of claim 3, wherein the test plate has a plurality of apertures and each shaft portion of a bolt associated with one of the plurality of support legs is configured to pass through an aperture of the plurality of apertures in the test plate.

5. The test stand of claim 4, wherein the spring is one of a plurality of springs with each spring of the plurality of springs disposed between the top end of an associated support leg and the test plate.

6. The test stand of claim 5, wherein the plurality of springs have an effective spring constant that is greater than an effective spring constant of the tunable mass damper.

7. The test stand of claim 1, wherein the latch mechanism includes a hook portion and a latch extension, the hook portion being rotatably coupled to the lever and the latch extension adjustably coupled to the hook portion.

8. The test stand of claim 7, wherein the latch extension is configured to be adjusted relative to the hook portion in order to change the predetermined position where the test plate is released.

9. The test stand of claim 7, wherein the latch extension is configured to induce rotation of the hook portion under sufficient rotation of the lever relative to the support base.

10. The test stand of claim 9, wherein the latch mechanism is configured to release the test plate upon rotation of the hook portion.

11. The test stand of claim 9, wherein the latch extension is configured to receive a contact force upon sufficient rotation of the lever relative to the support base, the contact force oriented so that a linear extension of the contact force does not intersect a rotation axis between the latch mechanism and the lever.

12. The test stand of claim 11, wherein the latch extension has sufficient mass to return the hook portion to a vertical orientation after releasing the test plate through a gravitational torque acting on the mass of the latch extension.

13. A method of characterizing oscillation properties of a tunable mass damper, the method comprising:
- mounting a tunable mass damper to a test plate, the test plate being biased away from a support base by a spring;
- moving the test plate against a force of the spring until a latch mechanism is disengaged at a predetermined separation distance between the test plate and the support base;
- stopping motion of the test plate relative to the support base by a stop mechanism; and
- measuring oscillation properties of the tunable mass damper.

14. The method of claim 13, wherein measuring the oscillation properties of the tunable mass damper includes measuring at least one of an oscillation frequency of the tunable mass damper and a characteristic damping time of the tunable mass damper.

15. The method of claim 13, further comprising:
- adjusting the latch mechanism so as to alter the predetermined separation distance between the test plate and the support base at which the latch mechanism is disengaged.

16. The method of claim 15, wherein the latch mechanism includes a hook portion and a latch extension adjustably coupled to the hook portion, the hook portion configured to be releasably coupled to the test plate and the latch extension configured to induce rotation of the latch mechanism, and wherein adjusting the latch mechanism includes changing the relative disposition of the latch extension and the hook portion.

17. A system for testing a tunable mass damper, the system comprising:
- a test stand configured to provide a repeatable impulse to a tunable mass damper, the test stand including:
  - a support base;
  - a test plate coupled to the support base, the test plate configured to move relative to the support base and to fixedly carry a tunable mass damper;
  - a biasing member urging the test plate away from the support base;
  - a loading member configured to move the test plate relative to the support base against the urging of the biasing member; and
  - a release mechanism configured to automatically release the test plate from the loading member when the test plate is at a predetermined position relative to the support base; and
- a computing device including:
  - a processor;
  - a memory; and
  - a program including a set of instructions stored in the memory and executable by the processor to:
  - receive data from a detector associated with the tunable mass damper; and
  - identify one or more oscillation characteristics of the tunable mass damper based on the received data, the one or more oscillation characteristics including at least one of an oscillation frequency of the tunable mass damper and a characteristic damping time of the tunable mass damper.

18. The system of claim 17, wherein the detector associated with the tunable mass damper is a position detector integrated into the tunable mass damper so as to monitor position of a mass within the tunable mass damper over time.

19. The system of claim 17, wherein the test plate is configured to move relative to the support base at the urging of the biasing member after being released by the release mechanism until said movement is halted by a stop mechanism of the support base.

20. The system of claim 19, wherein the movement and subsequent halting of the test plate excites oscillations of the tunable mass damper.

* * * * *